(12) United States Patent
Alattar et al.

(10) Patent No.: US 9,972,204 B2
(45) Date of Patent: May 15, 2018

(54) TRAFFIC SIGNAL COLLISION DATA LOGGER

(71) Applicant: INTERNATIONAL BUSINESS MACHINES CORPORATION, Armonk, NY (US)

(72) Inventors: Zaid M. Alattar, Tucson, AZ (US); Albert E. Dennes, Tucson, AZ (US); Ernesto E. Figueroa, Sahuarita, AZ (US); Thomas T. Jesukaitis, Lone Tree, CO (US); Christopher J. Miller, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/066,475

(22) Filed: Mar. 10, 2016

(65) Prior Publication Data

US 2017/0263118 A1    Sep. 14, 2017

(51) Int. Cl.
| | |
|---|---|
| G08B 21/00 | (2006.01) |
| G08G 1/04 | (2006.01) |
| G08G 1/01 | (2006.01) |
| G11B 20/10 | (2006.01) |
| G11B 27/10 | (2006.01) |

(52) U.S. Cl.
CPC ............. *G08G 1/04* (2013.01); *G08G 1/0116* (2013.01); *G08G 1/0137* (2013.01); *G11B 20/10527* (2013.01); *G11B 27/10* (2013.01); *G11B 2020/10546* (2013.01)

(58) Field of Classification Search
CPC ........ G08G 1/095; G08G 1/01; G08G 1/0104; G08G 1/0175; G08G 1/205; G08G 1/04; G07C 5/0891

USPC ......................................................... 340/937
See application file for complete search history.

(56) References Cited

U.S. PATENT DOCUMENTS

| | | |
|---|---|---|
| 5,717,391 A | 2/1998 | Rodriguez |
| 5,784,007 A | 7/1998 | Pepper |
| 6,466,260 B1 | 10/2002 | Hatae et al. |
| 7,348,895 B2 | 3/2008 | Lagassey |
| 8,466,962 B2 | 6/2013 | Hutchison |

(Continued)

FOREIGN PATENT DOCUMENTS

WO    2009133429 A1    11/2009

OTHER PUBLICATIONS

Jae-Yee Kim, "An Analysis on Acoustic Characteristic of the Intersection Noise for Performance Improvement in the Accident Sound Detection System," Third 2008 International Conference on Convergence and Hybrid Information Technology, IEEE, 2008 (5 pages).

*Primary Examiner* — Mark Rushing
(74) *Attorney, Agent, or Firm* — Griffiths & Seaton PLLC

(57) ABSTRACT

Various embodiments for logging traffic collision data at a traffic signal, by a processor device, are provided. In one embodiment, a method comprises recording a media loop of a predetermined time and an associated traffic light sequence by a recording device placed in substantially close proximity to a traffic signal; and upon registering a media event above a predetermined threshold level, saving instant media loop information and the associated traffic light sequence to a storage device for aiding in determining fault in a traffic accident.

13 Claims, 4 Drawing Sheets

(56) References Cited

U.S. PATENT DOCUMENTS

| | | | | |
|---|---|---|---|---|
| 2002/0035422 | A1* | 3/2002 | Sasaki | G07C 5/085 |
| | | | | 701/32.2 |
| 2006/0092043 | A1* | 5/2006 | Lagassey | G07C 5/008 |
| | | | | 340/907 |
| 2007/0194893 | A1* | 8/2007 | Deyoe | G08B 1/08 |
| | | | | 340/436 |
| 2009/0278933 | A1* | 11/2009 | Maeda | G07C 5/0866 |
| | | | | 348/148 |
| 2014/0358394 | A1* | 12/2014 | Picciotti | G06F 21/6218 |
| | | | | 701/70 |
| 2016/0328940 | A1* | 11/2016 | Yi | G08B 21/043 |

* cited by examiner

TRAFFIC SIGNAL COLLISION DATA LOGGER

BACKGROUND OF THE INVENTION

Field of the Invention

This disclosure relates in general to traffic control and traffic signal systems. More particularly, the present invention relates to various embodiments for logging traffic collision data at a traffic signal.

Description of the Related Art

Traffic signaling control systems are a matter of public safety. Traffic related accidents account for a vast majority of accident related injuries and fatalities each year, and as passenger traffic steadily increases, the coinciding risk of accident and injury escalates. As great strides and advances in technologies come to fruition, these traffic signaling systems have largely remained unchanged since their conception and implementation.

Accordingly, current advances in traffic, traffic signaling systems, and the greater understanding of traffic flow itself have made progress in these systems advantageous endeavors for efficiency and safety.

SUMMARY OF THE DESCRIBED EMBODIMENTS

Various embodiments for logging traffic collision data at a traffic signal, by a processor device, are provided. In one embodiment, a method comprises recording a media loop of a predetermined time and an associated traffic light sequence by a recording device placed in substantially close proximity to a traffic signal; and upon registering a media event above a predetermined threshold level, saving instant media loop information and the associated traffic light sequence to a storage device for aiding in determining fault in a traffic accident.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
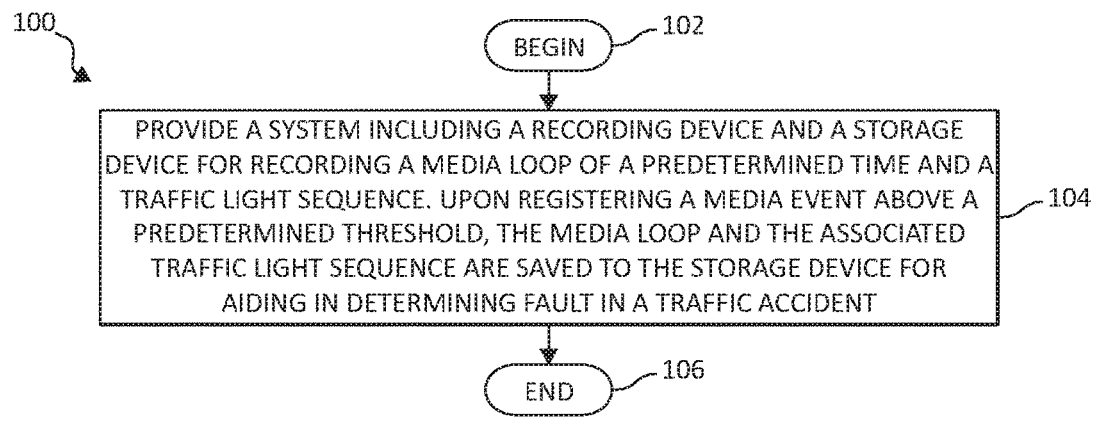
FIG. 1 is a flow chart illustrating a method for logging traffic collision data at a traffic signal, according to aspects of the present invention.

As aforementioned, traffic signaling control systems are a matter of public safety. Traffic related accidents account for a vast majority of accident related injuries and fatalities each year, and as passenger traffic steadily increases, the coinciding risk of accident and injury escalates.

Traffic accidents at intersections, in particular, happen everyday. The most controversial accidents are generally concerning the change of traffic lights. An example is a first driver accelerating their vehicle when approaching a traffic light turning yellow to try and get through the intersection before the light changes to red, while in the opposing direction, a second driver is attempting to make a left turn and collides with the first vehicle coming through the light. Any accidents related to a change of lighting sequence become complex, as the first driver may or may not have passed through the intersection while the traffic light was red. Fault is usually determined by witnesses at the scene of the accident.

Prior solutions to determining fault in a traffic accident at intersections may include the use of traffic cameras. However, cameras may be mounted in a location such that the angle of the camera is unable to see the traffic lighting color sequence, or possibly even miss the incident. Additionally, some cameras may not record at a high enough frame rate to capture vital footage by missing even milliseconds of picture. Other complications may include glare into the camera, or, if operated at night, the inability to capture the scene due to inadequate light. Sometimes, police or others may contact a traffic control center to determine the traffic light sequence at a specific time, although once again, the time of impact may still be a rough estimate provided by the drivers themselves, witnesses, or cameras capturing the scene.

Accordingly, the present invention considers a system for logging traffic collision data at a traffic signal. The system may be implemented in a variety of embodiments suited to the individual goals of the implementer. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter, and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

FIG. 1 illustrates a method 100 for logging traffic collision data at a traffic signal, in accordance with one embodiment of the present invention. The method 100 may be performed in accordance with the present invention in any of the environments depicted in FIGS. 2A, 2B, 3, and 4 described infra, among others, in various embodiments. Of course, more or less operations than those specifically described in FIG. 1 may be included in method 100, as would be understood by one of skill in the art upon reading the present descriptions.

Each of the steps of the method 100 may be performed at least in part by any suitable component of a computing environment. For example, in various embodiments, the method 100 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 102), a media loop of a predetermined time and an associated traffic light sequence are recorded by a recording device placed in substantially close proximity to a traffic signal. Upon registering a media event above a predetermined threshold level, an instant media loop and the associated traffic light sequence is saved to a storage device for aiding in determining fault in a traffic accident (step 104). The method ends (step 106).

The present invention employs a recording device to capture a color sequence of a particular traffic signal based on a registered media event. A media loop of a predetermined time (e.g. a 15 second loop) is recorded until a media event above a predetermined threshold is triggered, at which point the current media loop information (in which the media event was triggered) and the associated traffic lighting sequence (i.e. traffic light colors) occurring during the media event are saved to a storage device.

In one embodiment, the recording device is an independent microphone. In another embodiment, the recording device may be a microphone associated with a camera. The recording device may be mounted on or substantially close to a given traffic signal, such as on the traffic signal pole and between the lights of the traffic signal itself. Preferably, each traffic signal in a given intersection is outfitted with the recording device. Each recording device is in communication with a central unit which houses a storage device. The central unit may be located at the base of the traffic signal or remotely nearby.

Figure 2A:
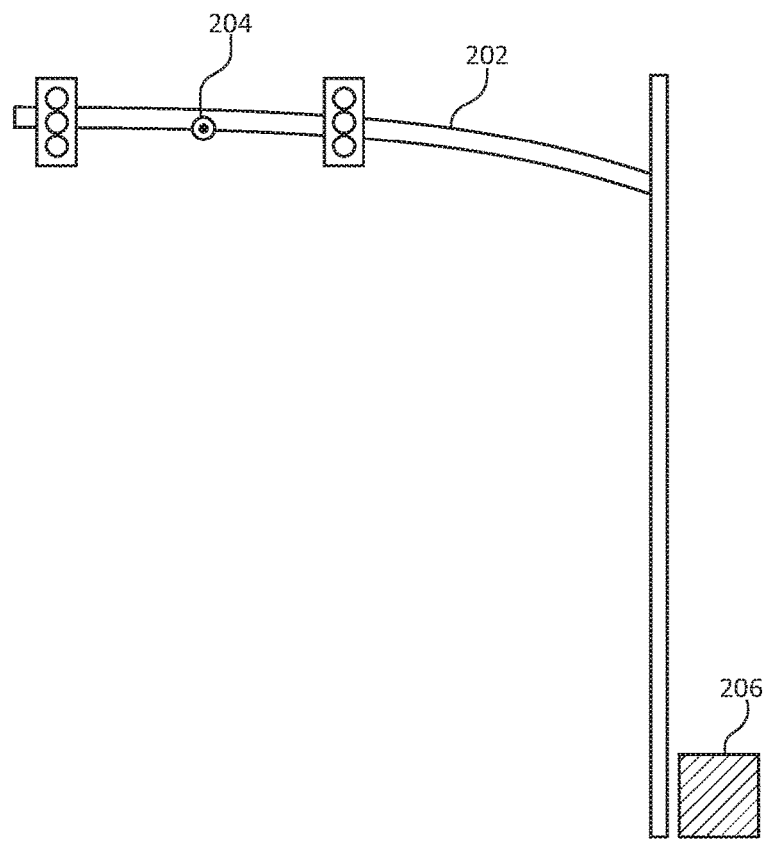
FIG. 2A is a perspective view of a traffic signal, according to aspects of the present invention.

FIG. 2A is a perspective view of a traffic signal, according to aspects of the present invention. Illustrated are a traffic signal 202, a recording device 204, and a central unit 206. The central unit 206 is in communication with the recording device 204 and includes a storage device therein. Here again, the recording device 204 may be an independent microphone, or a microphone associated with a camera device.

Figure 2B:
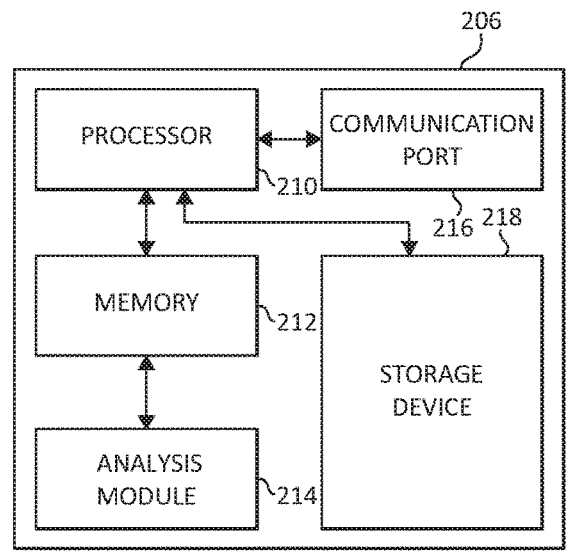
FIG. 2B is a block diagram of a central unit illustrated in FIG. 2A, according to aspects of the present invention.

FIG. 2B is a block diagram of the central unit 206 illustrated in FIG. 2A, and in one embodiment, may be implemented at least as part of a system for effecting mechanisms of the present invention. Illustrated is a processor 210, memory 212, analysis module 214, communication port 216, and storage device 218. The processor 210 is in communication with the memory 212, analysis module 214, communication port 216, and the storage device 218 via a signal-bearing medium. Of course, one skilled in the art would recognize that additional or fewer of such components may be used to provide the functionality of the present invention. The communication port 216, may be, for example, used to facilitate the communication of the central unit 206 with the recording device 204. This communication may be through a wire, a wireless signal, or again, any signal-bearing medium. The analysis module 214 may be used in conjunction with the processor 210 to detect various threshold limits as will be described. Memory 212 may include such memory as electrically erasable programmable read only memory (EEPROM) or a host of related devices, and the storage device 218 may include hard disk drive (HDD) devices, solid-state devices (SSD), etc. Various aspects of the illustrated embodiments may be realized using one or more of these components as will be further discussed.

In one embodiment, a media event is defined by the present invention as a captured sound by the microphone of the recording device 204. In another embodiment, a media event may be a heat signature as captured by a camera device. In still another embodiment, a media event may include object motion captured by a camera device. The present invention uses threshold levels of a given media event to trigger a save of the current media loop information to the storage device 218. Thus, in one embodiment, a sound louder than a predetermined decibel threshold triggers the recording device 204 to save the current media loop information to the storage device 218 in the central unit 206. In another embodiment, a detected heat signature warmer than a predetermined heat signature threshold by a camera device triggers the recording device 204 to save the current media loop information to the storage device 218 in the central unit 206. In still another embodiment, a change in object motion according to a predetermined algorithm as captured by a camera device triggers the recording device 204 to save the current media loop information to the storage device 218 in the central unit 206.

In any case, the traffic light sequence, or traffic light colors, are saved to the storage device 218 along with the captured media loop information. Additionally, the storage device 218 of the central unit 206 independently collects data points of when the associated traffic signal 202 changes colors, however, these data points expire at the end of the instant media loop unless a save is triggered by capturing the media event above the predetermined threshold level by the recording device 204. Upon the expiration of the predetermined time period set for the media loop with no triggered media event, the instant media loop information is discarded and reset.

Figure 3:
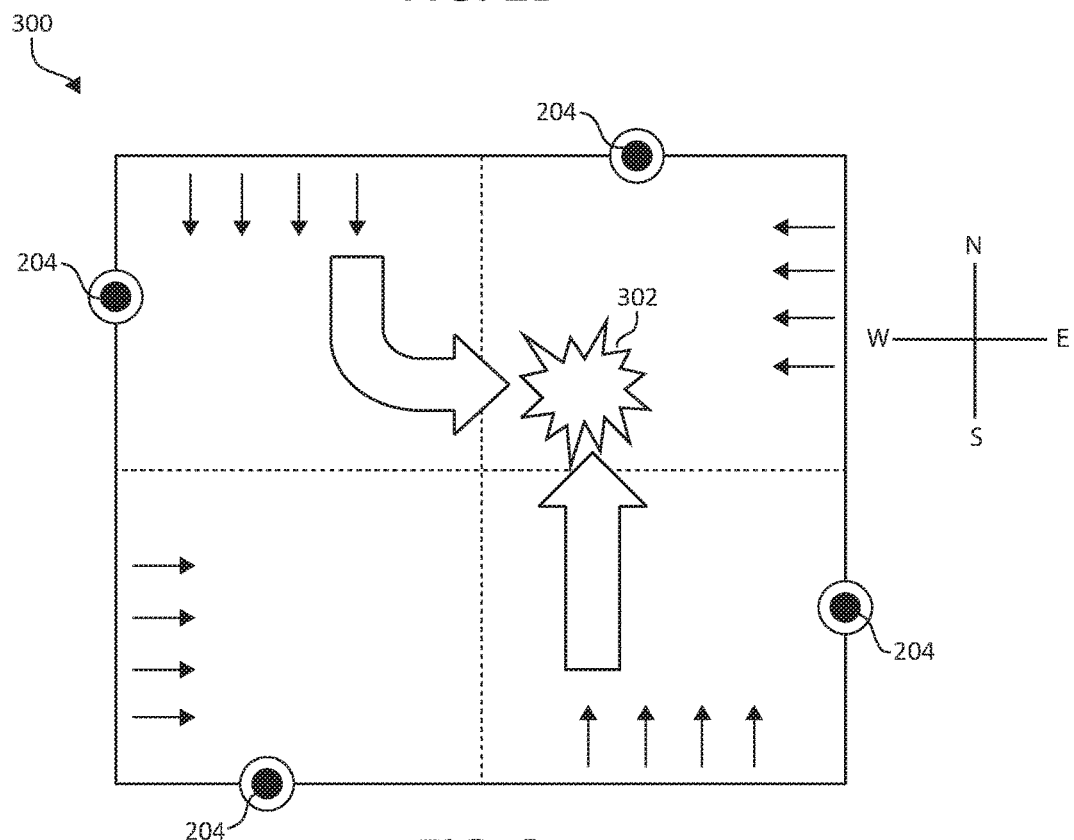
FIG. 3 is a block diagram of a traffic intersection, according to aspects of the present invention.

FIG. 3 is a block diagram 300 of a traffic intersection. Illustrated are directional travel lanes and positions of each recording device 204. As aforementioned, preferably, each traffic signal 202 at a given intersection is provided a recording device 204 as shown. Diagram 300 depicts a traffic collision 302 occurring closest to the recording device 204 in the North quadrant, as will be described further in FIG. 4.

Figure 4:
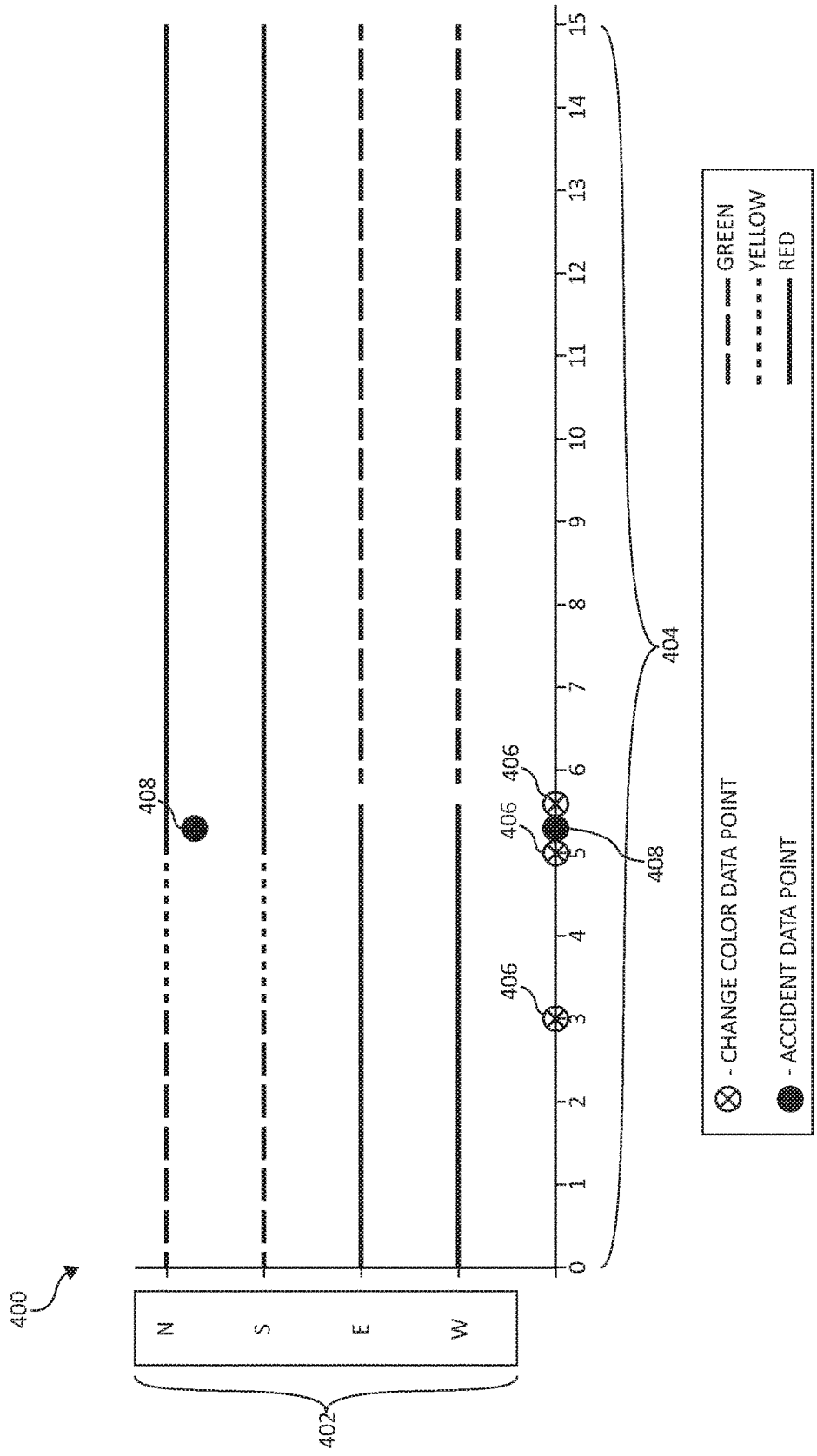
FIG. 4 is a graphical diagram illustrating an event data log, according to aspects of the present invention.

FIG. 4 is a graphical diagram illustrating an event data log 400. Depicted along the X graphical quadrant 402 is the lighting sequence for Northbound, Southbound, Eastbound, and Westbound lights (note: this graph does not include independent left turn lights and therefore bases yield left turn on a green light). The Y graphical quadrant 404 illustrates a predetermined media loop time (in this example, 15 seconds) before the media loop resets. The predetermined media loop time, of course, may be adjusted to necessary circumstances.

Event log 400 shows color change data points 406 of the traffic signal 202, and accident data points 408. Color change data points 406 indicate that at time 3, the Northbound and Southbound lights turned yellow, and at time 5, the Northbound and Southbound lights turned red. The traffic collision 302 is then captured as an accident data point 408 triggered by a media event registered above the predetermined threshold at time 5.2 by recording device 204. At time 5.4, the color change data points 406 indicate that that the Eastbound and Westbound lights then turned green. In this example, because a media event above the predetermined threshold level was registered, the media loop information including color change data points 406 and accident data points 408 would be saved to the storage device 218 in the central unit 206. In one example, the event log 400 including the accident data point 408 at time 5.2 may be recorded to the storage device 218 in the central unit 206 as the following, including an associated timestamp:
Timestamp: 10:34:23.1
Decibel Level: 152.4 dB
East Straight: RED
East Left Turn: RED
East Right Turn: N/A
West Straight: RED
West Left Turn: RED
West Right Turn: N/A
North Straight: RED
North Left Turn: RED
North Right Turn: N/A
South Straight: RED
South Left Turn: RED
South Right Turn: N/A As illustrated in FIG. 3 and FIG. 4, the traffic collision 302 was recorded nearest the Northbound traffic signal. This is known based upon the lighting sequence and because the media event (e.g. the decibel level) occurred strongest (i.e. loudest) nearest the recording device 204 on the Northbound traffic signal. The stored media loop and data point information may be retrieved from storage device 218 and given to authorities to aid in determining fault in the traffic collision 302.

Figure 5:
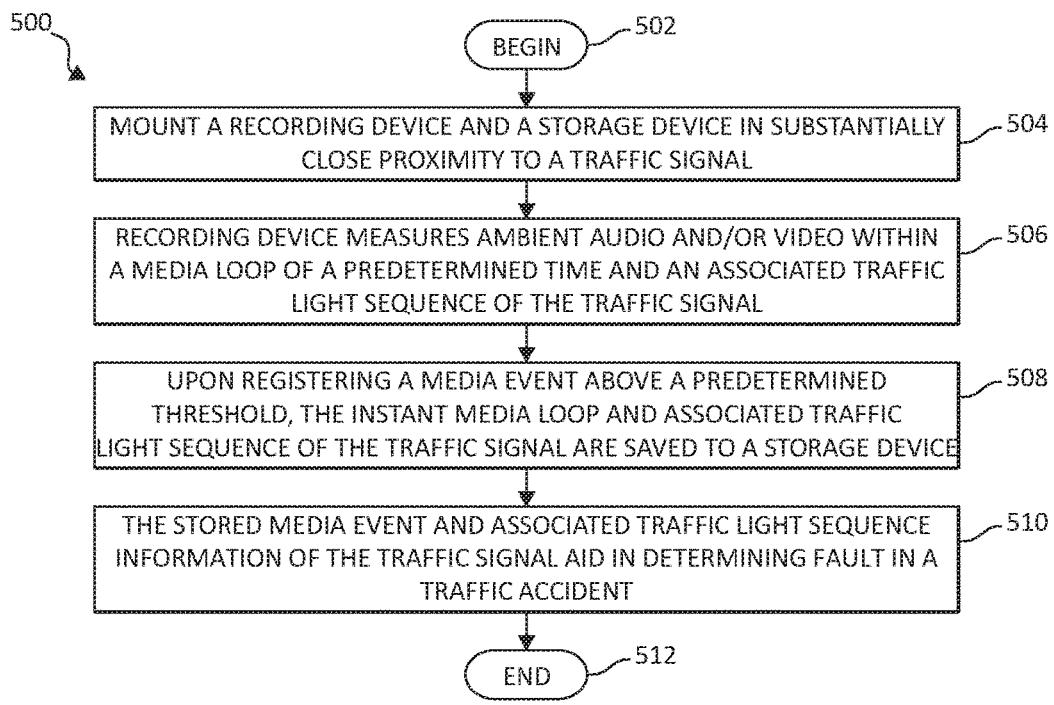
FIG. 5 is an additional flow chart illustrating a method for logging traffic collision data at a traffic signal, according to aspects of the present invention.

FIG. 5 illustrates a method 500 for logging traffic collision data at a traffic signal, in review of the functionality of the present invention. The method 500 may be performed in accordance with the present invention in any of the environments depicted in FIGS. 2A, 2B, 3, and 4, among others, in various embodiments. Of course, more or less operations than those specifically described in FIG. 5 may be included in method 500, as would be understood by one of skill in the art upon reading the present descriptions.

Each of the steps of the method 500 may be performed at least in part by any suitable component of a computing environment. For example, in various embodiments, the method 100 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 502), a recording device 204 and a storage device 218 (housed in a central unit 206) are mounted in substantially close proximity to a traffic signal 202 (step 504). As aforementioned, the recording device 204 may be preferably mounted substantially on the traffic signal 202 (e.g. between the traffic lights), and the central unit 206 containing the storage device 218 may be preferably located at a corner base or remotely near the traffic signal 202. The recording device 204 measures ambient audio and/or video within a media loop of a predetermined time and records an associated traffic light sequence of the traffic signal 202 (step 506).

Upon registering a media event above a predetermined threshold level (e.g. a sound above a predetermined decibel level), the instant media loop information and associated traffic light sequence of the traffic signal 202 are saved to a storage device 218 (step 508). This media loop includes data points as depicted in FIG. 4 of color sequence changes and registered accident data and an associated timestamp. The stored media loop information and associated color change and accident data points may then be retrieved from the storage device 218 and given to authorities to aid in determining fault in a traffic accident (step 510). The method ends (step 512).

The present invention may be a system, a method, an apparatus, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for logging traffic collision data at a traffic signal, by a processor device, comprising:
   recording a media loop of a predetermined time and an associated traffic light sequence by a recording device placed in substantially close proximity to a traffic signal; and
   upon registering a media event above a predetermined threshold level comprising registering a sound above a predetermined decibel level and detecting a change in moving object motion above a predetermined object motion level such that, saving instant media loop information and the associated traffic light sequence to a storage device for aiding in determining fault in a traffic accident; wherein the media loop information includes the traffic light sequence including a traffic light color at incremented intervals prior to and after the media event, a registered decibel level of the media event, and timestamp information.

2. The method of claim 1, wherein the recording device is one of an independent microphone and a microphone associated with a camera.

3. The method of claim 1, wherein the media event above the predetermined threshold level comprises registering a heat signature above a predetermined heat signature level.

4. The method of claim 1, further including discarding the instant media loop information if the media event above the predetermined threshold level is not reached during the instant media loop.

5. A system for logging traffic collision data at a traffic signal, the system comprising:

a recording device placed in substantially close proximity to a traffic signal;
a storage device in communication with the recording device; and
at least one processor device in communication with the recording device and the storage device, wherein the at least one processor device:
records a media loop of a predetermined time and an associated traffic light sequence by the recording device placed in substantially close proximity to the traffic signal, and
upon registering a media event above a predetermined threshold level comprising registering a sound above a predetermined decibel level and detecting a change in moving object motion above a predetermined object motion level, saves instant media loop information and the associated traffic light sequence to the storage device for aiding in determining fault in a traffic accident; wherein the media loop information includes the traffic light sequence including a traffic light color at incremented intervals prior to and after the media event, a registered decibel level of the media event, and timestamp information.

6. The system of claim 5, wherein the recording device is one of an independent microphone and a microphone associated with a camera.

7. The system of claim 5, wherein the media event above the predetermined threshold level comprises registering a heat signature above a predetermined heat signature level.

8. The system of claim 5, wherein the at least one processor device discards the instant media loop information if the media event above the predetermined threshold level is not reached during the instant media loop.

9. A computer program product for logging traffic collision data at a traffic signal, by a processor device, the computer program product embodied on a non-transitory computer-readable storage medium having computer-readable program code portions stored therein, the computer-readable program code portions comprising:
an executable portion that records a media loop of a predetermined time and an associated traffic light sequence by a recording device placed in substantially close proximity to a traffic signal; and
upon registering a media event above a predetermined threshold level comprising registering a sound above a predetermined decibel level and detecting a change in moving object motion above a predetermined object motion level, saves instant media loop information and the associated traffic light sequence to a storage device for aiding in determining fault in a traffic accident; wherein the media loop information includes the traffic light sequence including a traffic light color at incremented intervals prior to and after the media event, a registered decibel level of the media event, and timestamp information.

10. The computer program product of claim 9, wherein the recording device is one of an independent microphone and a microphone associated with a camera.

11. The computer program product of claim 9, wherein the media event above the predetermined threshold level comprises registering a heat signature above a predetermined heat signature level.

12. The computer program product of claim 9, further including an executable portion that discards the instant media loop if the media event above the predetermined threshold level is not reached during the instant media loop.

13. An apparatus for logging traffic collision data at a traffic signal, comprising:
a recording device placed in substantially close proximity to a traffic signal that records a media loop of a predetermined time and an associated traffic light sequence, and upon registering a media event above a predetermined threshold level comprising registering a sound above a predetermined decibel level and detecting a change in moving object motion above a predetermined object motion level, saves instant media loop information and the associated traffic light sequence to a storage device for aiding in determining fault in a traffic accident; wherein the media loop information includes the traffic light sequence including a traffic light color at incremented intervals prior to and after the media event, a registered decibel level of the media event, and timestamp information.

* * * * *